United States Patent [19]

Okanoue et al.

[11] Patent Number: 5,303,226
[45] Date of Patent: Apr. 12, 1994

[54] RECEPTION OF TDMA DIGITAL DATA SIGNAL WITH COMPENSATION FOR CHANNEL VARIATIONS

[75] Inventors: Kazuhiro Okanoue; Yukitsuna Furuya, both of Tokyo, Japan

[73] Assignee: NEC Corporation, Japan

[21] Appl. No.: 955,320

[22] Filed: Oct. 1, 1992

[30] Foreign Application Priority Data

Oct. 1, 1991 [JP] Japan .................................. 3-253261

[51] Int. Cl.[5] .................................................. H04J 3/14
[52] U.S. Cl. ..................................... 370/17; 370/95.3; 375/12; 375/13
[58] Field of Search ................... 370/17, 95.3; 375/12, 375/13

[56] References Cited

U.S. PATENT DOCUMENTS

| | | | |
|---|---|---|---|
| 4,852,090 | 7/1989 | Borth | 370/95.3 |
| 5,047,859 | 9/1991 | Koo | 375/13 X |
| 5,127,051 | 6/1992 | Chan et al. | 375/13 X |

OTHER PUBLICATIONS

Globecom 1990, vol. 2, Dec. 1990, pp. 923-927.
Crozier, Stewart N. et al.. "Reduced Complexity Short-Block Data Detection", *41st IEEE* Vehicular Technology, May 1991, pp. 735-740.
Lopes, L. B., "Performance of Viterbi Equalisers for the GSM System", *Second IEE* National Conference on Telecommunications, Apr. 1989, pp. 61-66.
Ueda, Takashi et al., "Performance of Equalizers Employing a Re-Training RLS Algorithm for Digital Mobile Radio Communications", *40th IEEE Vehicular Technology*, May 1990, pp. 553-558.
K. Okanoue, "Improvements on Tracking Performances of Adaptive Viterbi MLSE Receiver", Trans. 1991 Spring Conference IEICE, Tokyo, pp. 2-624, 625.
A. Ushirokawa et al. "Viterbi Equalization on Time--Varying Channel", 2nd Makuhari Int. Conf. on High Tech., Chiba, pp. 101-104, Jan. 1991.
S. Sampei, "Complexity Reduction of RLS-Decision Feedback Equalizer Using Interpolation", Trans. 1991 Spring Conference IEICE, Tokyo, pp. 2-386.
J. G. Proakis, "Digital Communications", 1983, McGraw-Hill pp. 394-400.

*Primary Examiner*—Benedict V. Safourek
*Assistant Examiner*—Russell W. Blum
*Attorney, Agent, or Firm*—Ostrolenk, Faber, Gerb & Soffen

[57] ABSTRACT

When time-division multiplexed digital data signals are to be demodulated, symbols in a time slot and symbols in the next time slot are stored in memory. The digital data signal in each time slot includes a training sequence. Channel estimators extract channel information regarding stored signals from the signals themselves as well as from the training sequences in succeeding time slots and output the channel information to a channel information generator which combines the channel information from the channel estimators into channel information regarding the signal in the time slot. A demodulator receives the combined channel information and the stored signals and demodulates the signal in the time slot.

2 Claims, 8 Drawing Sheets

RECEPTION OF TDMA DIGITAL DATA SIGNAL WITH COMPENSATION FOR CHANNEL VARIATIONS

BACKGROUND OF THE INVENTION

1. Field of the Invention:

The present invention relates to a method of and an apparatus for successively transmitting digital data signals using the time-division multiplex access (TDMA) technique and automatically equalizing and demodulating the received digital data signals into output signals based on channel information extracted from the received digital data signals.

Figure 1:
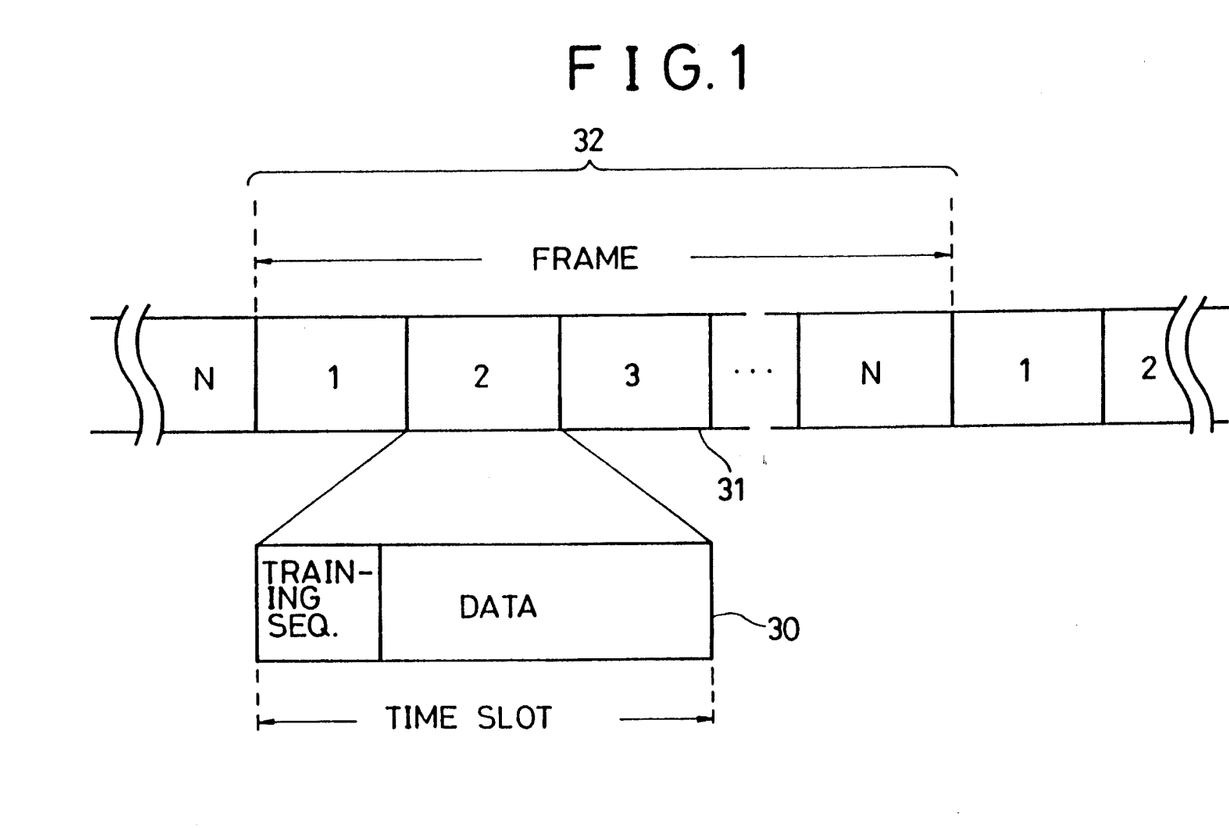
FIG. 1 is a diagram of a frame format for a conventional digital data signal for transmission in TDMA.

2. Description of the Related Art:

As shown in FIG. 1 of the accompanying drawings, data transmission in a TDMA system involves the successive transmission of N-channel data signals in a frame format 32 that are allocated respectively to N time slots 30, 31, each composed of N symbols. The first symbol Np of the frame in each of the time slots 30, 31 comprises a training sequence.

In order to eliminate intersymbol interference caused during data transmission as well as to cope with time-dependent variations in channel characteristics, data receivers in such a TDMA system extract channel information using the training sequences in the received time slots for initializing equalizers and demodulate the received data signal in each of the time slots.

As communication channels are designed for faster, multiplexed communications, short-term variations in the channels become more problematic. There have been proposed various systems capable of quickly following or compensating for burst variations which cannot be ignored in received time slots.

Figure 2:
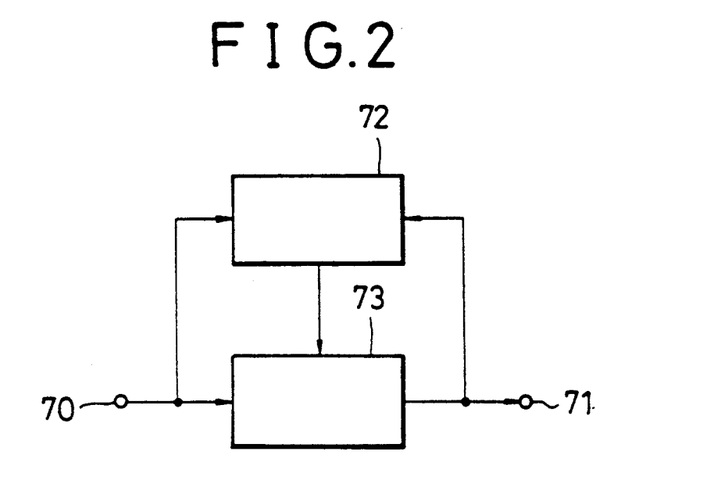
FIG. 2 is a block diagram of a conventional system for compensating for channel variations.

One of the proposed systems is shown in FIG. 2 of the accompanying drawings. The system includes an input terminal 70, an output terminal 71, a channel estimator 72, and a demodulator 73. The channel estimator 72 estimates channel information using a received signal from the input terminal 70 and a decision result from the demodulator 73 to compensate for channel variations (see, for example, K. Okanoue, Improvements on Tracking Performances of Adaptive Viterbi MLSE Receiver, trans. of 1991 Spring National Conference, Institute of Electronics, Information and Communication Engineers, Tokyo, SB-4-4, pp. 2-624, 625, March 1991).

Figure 3:
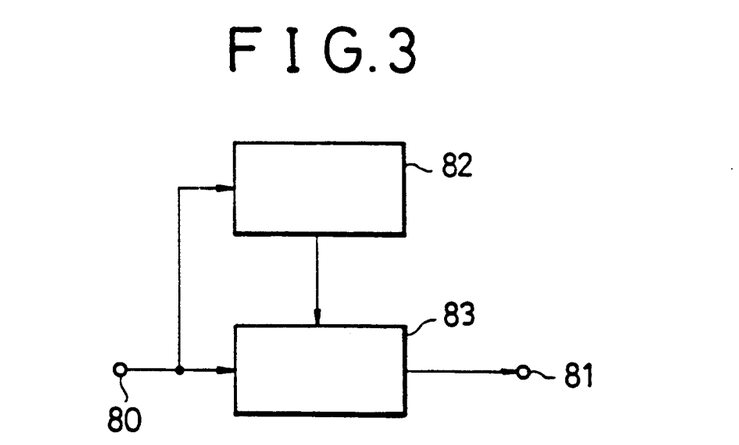
FIG. 3 is a block diagram of another conventional system for compensating for channel variations.

Another proposed system, which is shown in FIG. 3 of the accompanying drawings, has an input terminal 80, an output terminal 81, a channel estimator 82, and a demodulator 83. The channel estimator 82 establishes an equalizer using only received signals from the input terminal 80 and not a priori channel information to compensate for channel variations (see, for example, A. Ushirokawa et al., Viterbi Equalization on Time-varying Channel, 2nd Makuhari Int. Conf. on High Tech., Chiba, A-2-2, pp. 101-104, January 1991).

Figure 4:
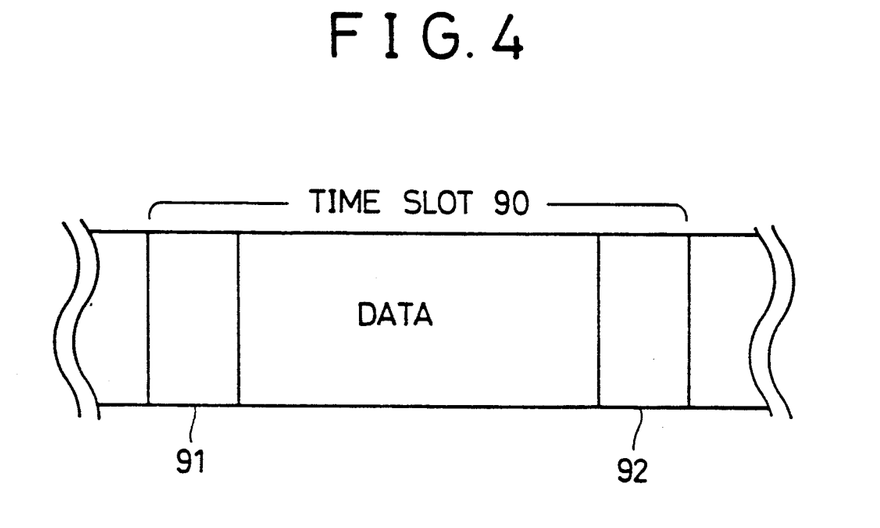
FIG. 4 is a diagram of a frame format for another conventional digital data signal for transmission in TDMA.
Figure 5:
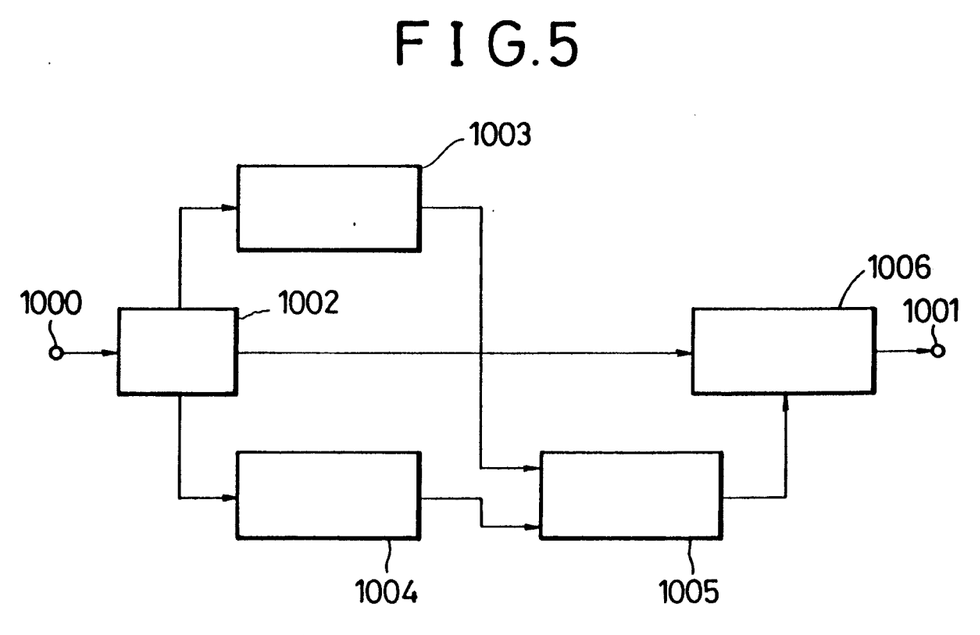
FIG. 5 is a block diagram of still another conventional system for compensating for channel variations.

FIGS. 4 and 5 of the accompanying drawings show still another proposed system. As shown in FIG. 4, the system employs a signal format including at least two training sequences 91, 92 in one time slot 90 and interpolates a plurality of results estimated from the training sequence signals into channel information. An equalizer is established using the channel information thus created to compensate for channel variations. As shown in FIG. 5, the system includes a memory 1002 for storing a signal received in one time slot 90 from an input terminal 1000. Channel estimators 1003, 1004 are supplied with respective training sequence signals 91, 92 from the memory 1002, and estimate channel information at the times the respective training sequence signals 91, 92 are received. The system also has a channel information generator 1005 for combining the estimated channel information from the channel estimators 1003, 1004 into channel information over all the times in the time slot 90. The channel information generator 1005 outputs the produced channel information to a demodulator 1006. The demodulator 1006 demodulates the signal in the time slot 90 stored in the memory 1002, based on the channel information supplied from the channel information generator 1005. The demodulated signal is sent to an output terminal 1001. For more details, see, for example, S. Sampei, Complexity Reduction of RSL-Decision Feedback Equalizer using Interpolation, trans. of 1991 Spring National Conference, Institute of Electronics, Information and Communication Engineers, Tokyo, B-386, pp. 2-386, 1991.

Unfortunately, the above proposed systems suffer the following drawbacks:

The system shown in FIG. 2 controls the demodulator 73 using the decision result from the demodulator 73. If the decision result contains an error, the system will fail to compensate for channel variations, and the error will be transmitted, greatly degrading the characteristics of the received signal. The system shown in FIG. 3 does not produce such an error and is capable of effectively compensating for channel variations. However, because its algorithm for establishing an equalizer to compensate for channel variations is complex, the system is relatively large in scale. The system shown in FIGS. 4 and 5 is not large in scale and has a high capability to compensate for channel variations. However, it requires a plurality of training sequences in one time slot, resulting in a reduction in transmission efficiency. As the speed of channel variations increases, the system fails to compensate for the channel variations with sufficient accuracy based only on estimated values from the conventional training sequences and requires more training sequences, which in turn further reduces transmission efficiency.

SUMMARY OF THE INVENTION

It is an object of the present invention to provide a method of and an apparatus for compensating for high-speed variations in channels to quickly equalize and demodulate received digital data signals which have been transmitted over the channels according to the time-division multiple access process.

According to the present invention, there is provided a method of successively receiving time-division-multiplexed digital data signals, each composed of a plurality of symbols including a training sequence of symbols in one time slot, the method comprising the steps of storing received digital data signals, extracting first channel information from a portion of a stored digital data signal received in a first time slot and second channel information from a portion of a stored digital data signal received in a second time slot following the first time slot, combining the first and second channel information into an estimated value of channel information with respect to all the symbols of the digital data signal in the first time slot, and equalizing and demodulating all the symbols of the digital data signal in the first time slot with the estimated value of channel information.

According to the present invention, there is also provided an apparatus for successively receiving time-division-multiplexed digital data signals, each composed of a plurality of N symbols including a training sequence of Np symbols in one time slot, the system comprising memory means for storing N symbols of a digital data signal received in a first time slot and at least a training sequence of Np symbols of a digital data signal received in a second time slot following the first time slot, first channel information output means for extracting first channel information from a portion of the stored digital data signal including a training sequence of Np symbols in the first time slot and for outputting the first channel information, second channel information output means for extracting second channel information from a portion of the stored digital data signal including the training sequence of Np symbols in the second time slot and for outputting the second channel information, third channel information output means for combining the first and second channel information from the first and second channel information output means into third channel information with respect to the first time slot and for outputting the third channel information, and demodulating means for equalizing and demodulating the n symbols of the digital data signal in the first time slot with the first through third channel information.

The demodulating means receives the digital data signal that is received in the first time slot as three signal groups, i.e., the Np symbols of the training sequence and N1 symbols following the Np symbols in said first time slot, the last N2 symbols in said first time slot, and the remaining symbols therebetween, individually equalizes these signal groups with the first, second, and third channel information, respectively, and combines the equalized symbols into a demodulated signal in the first time slot.

When channel variations are relatively infrequent, the first and second channel information output means may extract channel information from only the respective training sequences, and the demodulating means may equalize and demodulate all the symbols in the time slot with the information produced by the third channel information output means.

With the above arrangement, the memory means stores not only the digital data signal received in the first time slot, but also stores at least the training sequence of the digital data signal received in the second time slot following the first time slot. The first, second, and third channel information output means extract channel information from portions of the stored signals, estimate channel information with respect to signal portions which are not extracted, and output the estimated channel information to the demodulating means. The demodulating means demodulates the digital data signal received in the time slot with the supplied channel information.

When channel variations occur at great frequency, the digital data signal received in one time slot cannot be equalized with sufficient accuracy based only on channel information extracted from one training sequence in the time slot. According to the present invention, however, it is possible to follow or compensate for frequent channel variations with sufficient accuracy without the need for a large-scale system and without reducing signal transmission efficiency.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 6:
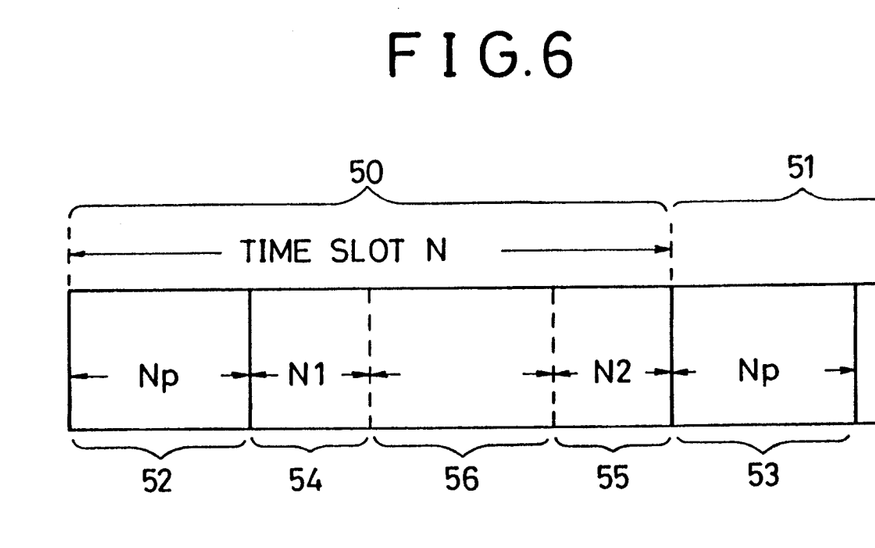
FIG. 6 is a diagram of a frame format for a digital data signal used in the present invention.

FIG. 6 shows a frame format for digital data signals used in the present invention. The digital data signals are transmitted in successive time slots 50, 51 each composed of N symbols. The digital data signals in the time slots 50, 51 include training sequences 52, 53 each composed of Np symbols. Each of the digital data signals in the time slots 50, 51 also includes data 54 composed of N1 symbols, data 55 composed of N2 symbols, and data 56 composed of $\{N-(N1+N2+Np)\}$ symbols.

Figure 7:
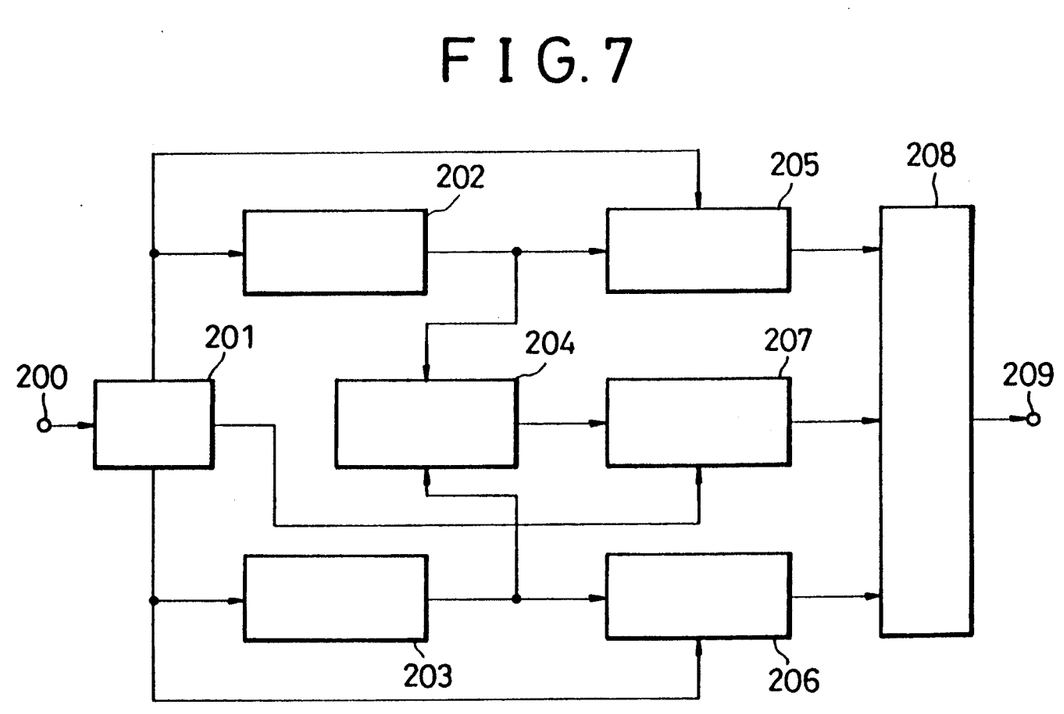
FIG. 7 is a block diagram of a system for receiving a digital data signal according to an embodiment of the present invention.

FIG. 7 shows a system for receiving a digital data signal according to an embodiment of the present invention. As shown in FIG. 7, the system has a memory 201, two channel estimators 202, 203, a channel information generator 204, three adaptive maximum likelihood channel estimators 205, 206, 207, and a demodulated signal generator 208.

The memory 201 stores all N symbols of a digital data signal to be demodulated which is supplied in one time slot 50 from an input terminal 200, and also Np symbols of the training sequence 53 of a next digital data signal supplied in a next time slot 51.

Each of the channel estimators 202, 203 extracts channel information from the Np symbols of the training sequence 52 in the time slot 50 and the N1 symbols of the data 54 in the time slot 50, or channel information from the Np symbols of the training sequence 53 in the time slot 51, based on the symbols stored in the memory 201. The channel estimators 202, 203 output first and second channel information, respectively, as primary estimated values of channel impulse responses.

The channel information generator 204 receives the first and second channel information from the channel estimators 202, 203 and generates and outputs third channel information, which is a combination of the first and second channel information, as an estimated value of a channel impulse response for the data 56.

The adaptive maximum likelihood channel estimators 205, 206, 207 receive the first, second, and third channel information, respectively, from the channel estimators 202, 203 and the channel information generator 204, and also receive the training sequence 52, the data 54, the data 55, or the data 56, and partially equalize and demodulate the digital data signal in the time slot 50.

The demodulated signal generator 208 combines partially equalized and demodulated signals from the adaptive maximum likelihood channel estimators 205, 206, 207 into a demodulated signal for the time slot 50, and supplies the demodulated signal to an output terminal 209.

The adaptive maximum likelihood channel estimators 205, 206, 207 may be uniquely constructed given the type of modulation for transmitted signals and the channel impulse response, for example, as shown in J. G. Proakis, Digital Communications, 1983, McGraw-Hill, pp. 394–400. Accordingly, the channel impulse response is used as the channel information in the present invention.

Although the system in the embodiment shown in FIG. 7 has a plurality of channel estimators and a plurality of adaptive maximum likelihood channel estimators, the system may have only one channel estimator and only one adaptive maximum likelihood channel estimator, and they may perform a plurality of processing operations according to time-division multiplexing. Although adaptive maximum likelihood channel estimators are used as demodulating means in the system shown in FIG. 7, decisionfeedback equalizers or linear equalizers may also be used for this purpose.

Figure 8:
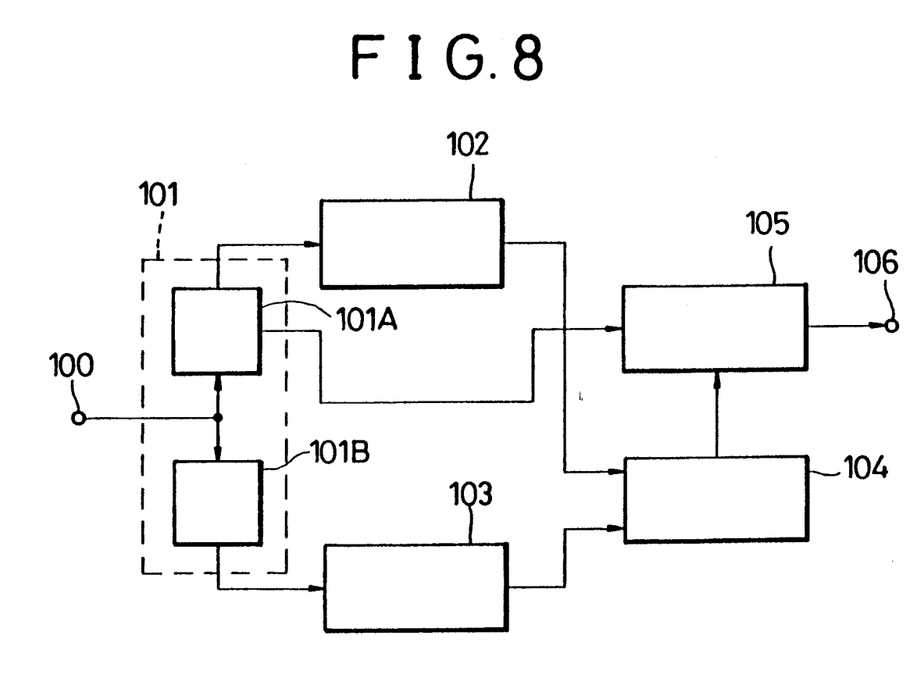
FIG. 8 is a block diagram of a system for receiving a digital data signal according to another embodiment of the present invention.

FIG. 8 shows a system for receiving a digital data signal according to another embodiment of the present invention. The system shown in FIG. 8 is a simplified modification of the system shown in FIG. 7 for receiving digital data signals whose N symbols in each time slot are subject to relatively infrequent variations, and channel information therefore has little estimated error.

As shown in FIG. 8, the system has a memory 101 comprising two memories 101A, 101B, two channel estimators 102, 103, a channel information generator 104, and a demodulator 105.

The memory 101A stores all N symbols of a digital data signal in the time slot 50 supplied from an input terminal 100, and the memory 101B stores Np symbols of the training sequence 53 of a digital data signal in the next time slot 51 supplied from the input terminal 100.

The channel estimators 102, 103 extract channel information from the Np symbols of the training sequences 52, 53 supplied from the memories 101A, 101B, respectively, and outputs respective first and second channel information to the channel information generator 104.

The channel information generator 104 combines the first and second channel information into third channel information as a channel impulse response with respect to the N symbols in the time slot 50, and outputs the third channel information to the demodulator 105.

The demodulator 105 receives the signal in the time slot 50 from the memory 101A, and equalizes and demodulates the supplied signal with the third channel information from the channel information generator 104. The demodulator 105 outputs the demodulated signal to an output terminal 106.

In the above embodiments, the channel estimators 202, 203 and 102, 103 may be the same as the conventional channel estimators 72, 82, 1003, 1004 shown in FIGS. 2, 3, and 5. If maximum-period sequences are successively transmitted as training sequences, a system disclosed in EP Patent Laid-Open No. A2-0396101 (K. Okanoue) published Nov. 7, 1990 may also be employed. After being initialized by the information extracted from the training sequence 52, the channel estimator 202 then estimates and outputs a channel impulse response based on the data 54 composed of N1 symbols.

Figure 9:
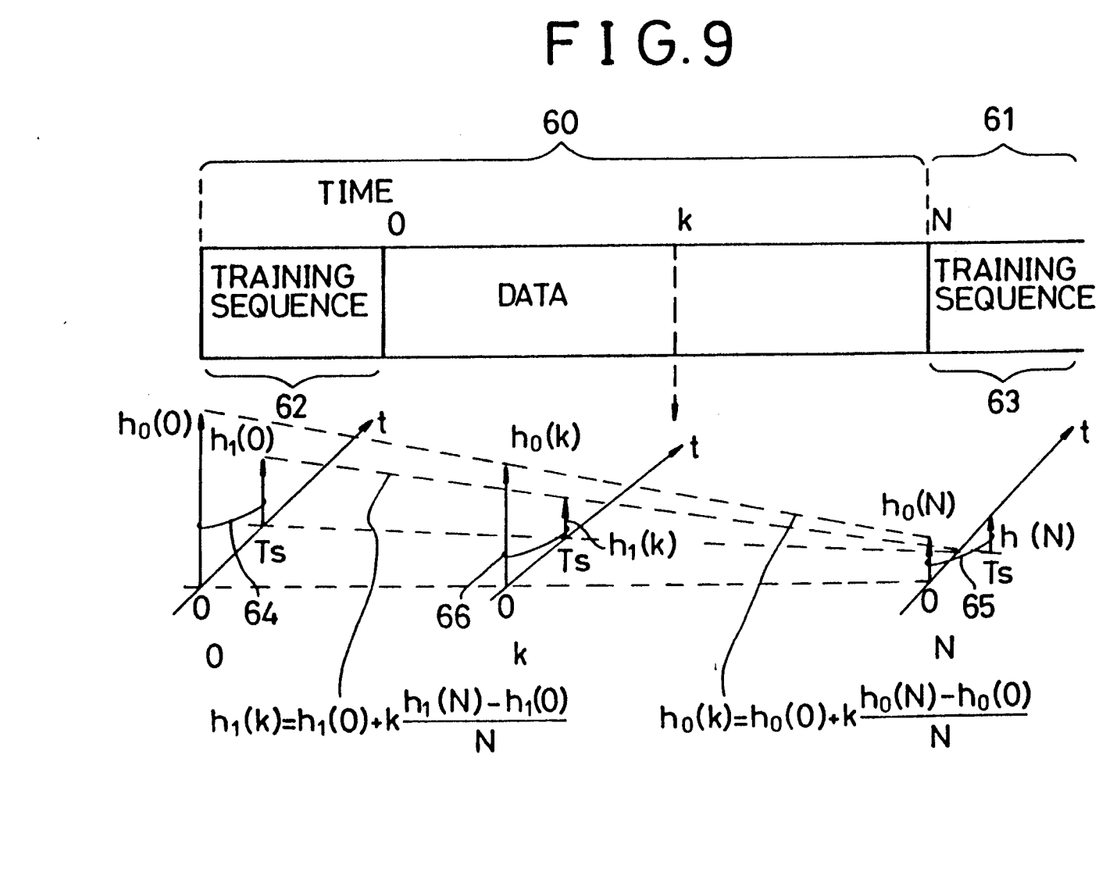
FIG. 9 is a diagram showing the operation of a channel information generator of each of the systems according to the embodiments.

The channel information generators 204, 104 generate a channel impulse response as third channel information from two, i.e., the first and second, channel information, according to an algorithm which produces an intermediate channel impulse response between the two channel impulse responses according to linear interpolation. FIG. 9 shows, by way of example, the manner in which the channel information generator 104 generates third channel information. FIG. 9 illustrates a two-wave model including a main wave $h_0$ and a wave $h_1$ that is delayed by a one-symbol time Ts with respect to the main wave $h_0$. It is assumed that channel impulses $h_0(O)$, $h_1(O)$ estimated from a training sequence 62 in a time slot 60 are regarded as channel impulses 64 at a time 0, and channel impulse responses $h_0(N)$, $h_1(N)$ estimated from a training sequence 63 in a time slot 61 are regarded as channel impulses 65 at a time N. The channel information generator 104 calculates values $h_0(k)$, $h_1(K)$ of channel impulse responses 66 at a time k according to the following equations:

$$h_0(k) = h_0(O) + k \times \{h_0(N) - h_0(O)\}/N \qquad (1),$$

$$h_1(k) = h_1(O) + k \times \{h_1(N) - h_1(O)\}/N \qquad (2).$$

Although certain preferred embodiments of the present invention have been shown and described in detail, it should be understood that various changes and modifications may be made therein without departing from the scope of the appended claims.

What is claimed is:

1. A method of successively receiving time-division-multiplexed digital data signals each composed of a plurality of symbols including a training sequence of symbols in one time slot, said method comprising the steps of:

storing receiving digital data signals, extracting first channel information from a portion of a stored digital data signal received in a first time slot and second channel information from a portion of a stored digital signal received in a second time slot immediately following the first time slot, combining said first and second channel information into an estimated value of third channel information with respect to all the symbols of the digital data signal in said first time slot, wherein the extracting step includes extracting the first channel information from Np symbols of the training sequence and N1 symbols following the Np symbols in said first time slot, and extracting the second channel information from the Np symbols of the training sequence in the second time slot; and equalizing and demodulating all of the symbols of the digital data signal, wherein the equalizing and demodulating step includes equalizing the training sequence and N1 symbols in said first time slot with said first channel information, and equalizing last N2 symbols in said first time slot with said second channel information, equalizing remaining symbols, except the Np, N1 and N2 symbols, in said first time slot with third channel information, and combining the equalized symbols to demodulate and output all the symbols in said first time slot.

2. An apparatus for successively receiving time-division-multiplexed digital data signals each composed of a plurality of N symbols including a training sequence of Np symbols in one time slot, said system comprising:

memory means for storing N symbols of a digital data signal received in a first time slot and at least a training sequence of Np symbols of a digital data signal received in a second time slot following said first time slot, first channel information output means for extracting first channel information from a portion of the stored digital data signal including a training sequence of Np symbols in said first time slot and outputting said first channel information, second channel information output means for extracting second channel information from a portion of the stored digital data signal including the training sequence of Np symbols in said second time slot and outputting said second channel information, third channel information output means for combining said first and second channel information from said first and second channel information output means into third channel information with respect to said first time slot and outputting said third channel information, and demodulating means for equalizing and demodulating the N symbols of the digital data signal in said first time slot with said first through third channel information, wherein said first channel information output means comprises means for extracting the first channel information from the Np symbols of the training sequence and N1 symbols following the Np symbols in said first time slot, said second channel information output means comprises means for extracting the second channel information from the Np symbols of the training sequence in said second time slot, and said demodulating means comprises means for equalizing the training sequence and N1 symbols in said first time slot with said first channel information, equalizing last N2 symbols in said first time slot with said second channel information, equalizing remaining symbols, except the Np, N1, and N2 symbols, in said first time slot with said third channel information, and combining the equalized symbols to demodulate and output all the symbols in said first time slot.

* * * * *